3,080,332
AQUEOUS POLYVINYLACETATE COMPOSITIONS PRODUCING HAMMER EFFECT COATING
Wilbur M. Sullivan, Bloomfield, and Leonard A. Carlson, Murray Hill, N.J., assignors to Union Carbide Corporation, a corporation of New York
No Drawing. Filed Oct. 1, 1959, Ser. No. 843,634
26 Claims. (Cl. 260—29.6)

This invention relates to surface coating compositions and more especially to novel polyvinyl acetate latex compositions which when applied to base materials as a surface coating will produce self-induced three dimensional effects known as the hammer effect. The invention further relates to articles of manufacture consisting of various base materials having on the surface thereof a decorative as well as protective coating derived from our novel coating compositions.

Latex coatings are now well known in the protective coatings field. The widespread utility of such coatings has been the result of intensive research and the consequent development of emulsion polymerization techniques which permit the polymerization or copolymerization of a variety of monomers to produce high molecular weight polymers having, in general, outstanding resistance properties and especial suitability for particular coatings uses. The fact that latex coating systems utilize water as the carrier or application medium results in tremendous economic savings and also enables the production of coatings compositions that are non-toxic, non-flammable, and odorless. One of the further, more important advantages flowing from the use of latex systems is the ability to apply coatings at or above 50 percent solids content, by weight, and subsequently obtain dry films of the thickness normally desired in a protective coating with ordinary brush, spray, roller, dip, or blade methods. The application consistency is independent of the molecular weight of the polymer in the latex and the consistency depends rather upon the composition of the exterior or aqueous phase. Adjustment of the consistency of the aqueous phase is generally achieved through the addition of minor amounts of water soluble or colloidally dispersible materials that are well known to those skilled in the art. A further advantage obtainable through the use of latex coating systems is the ability to apply uniform coatings to porous, normally absorbent substrata such as kraft paper. Latexes in general will not penetrate nor be absorbed in such substrata. This "hold out" characteristic is of special value in applying sealer coatings to plaster, wallboard, paper and textiles. The formulation techniques for latex based coatings useful on a wide variety of surfaces such as exterior masonry, interior plaster and gypsum board, paper, cloth, metal and other base materials has now advanced to the point where the effects of certain additives, e.g., pigments, fillers, plasticizers, filming agents, surface active agents and other modifiers are generally understood. As a result certain principles of compounding latexes are now generally accepted and latex systems successfully compete with established coating compositions in most of the fields in which coatings are now used.

A very significant exception to this general utility or adaptability of emulsion polymer compositions for surface coatings has existed, and continues to exist, in the field of self-textured coatings, e.g. hammer effect coatings. As used in this application, the term "self-textured coatings" is to be construed as meaning coatings or surface finishes which develop patterns or textured appearances during the drying cycle which patterns or textured appearances give the effect of being three dimensional when viewed by the human eye. These effects, as implied by the term "self," are the direct result of forces developed within the coating composition itself rather than the result of any external manual or mechanical operations upon the coating either during or after the application of the coating composition to the base material. A particularly attractive, and therefore desirable, three dimensional effect is that known in the art as a "hammer" finish, resembling the indented appearance of hammered thin metal sheets. Although such effects have previously been achieved using solvent based coatings, there are to our knowledge no water base coating compositions employing non-homogeneous or polyphase dispersions, such as synthetic latex polymer compositions, which will form such self-induced three dimensional effects when applied to the surface of the base material which is to be protected and simultaneously decorated.

A further significant exception of the general utility of latex compositions as surface coatings has existed in the field of finishes containing metallic pigments. For example, in coatings pigmented with metallic aluminum powder or flakes, non-latex systems have been necessitated since the aluminum would react with any water present and hydrogen would be evolved. Similar problems exist when other powdered or flaked metallic pigments, e.g., powdered copper, bronze, brass, zinc, etc. are used. This problem insofar as aluminum pigments are concerned, has recently been solved by methods described in United States Patent 2,858,230 to Knoll et al. This patent relates in general to special methods of preparing a metallic aluminum containing pigment which may be used in water based paints, i.e., latex compositions. Similar methods modified as described hereinafter, enable the manufacture of self-texturing hammer effect coatings compositions containing metallic pigments such as bronze, brass, copper, etc., in lieu of aluminum, when such is desired.

The desirability of having coatings compositions which form self-induced hammer effects and which are based on the use of an aqueous vehicle or film former (that is, self-textured latex coating compositions) becomes immediately apparent when one considers the inherent advantages of such compositions such as those previously mentioned, i.e., low application consistency which is not dependent upon the molecular weight of the polymer within the latex and excellent "hold out" on porous substrata such as paper and paper board, as well as other advantages such as the greatly increased freedom from the fire hazards and toxicity problems generally involved when resin solution coating compositions are utilized. In addition there is the further advantage that no curing or oxidation of the applied film is required when water based coating compositions are used since drying in this case is a simple matter of allowing the volatiles to escape from the film. Such can be accomplished by a nominally brief heating at elevated temperatures after the coating has been applied and the pattern has formed. For example, heating for about two minutes at about 250° F. will normally be sufficient to dry the coating. This speed of drying is admirably suited to the processing schedules of present commercial paper coating equipment and is moreover highly desirable in cases where the requirement for quick drying is not so demanding. Hammer effect finishes derived from latex coating compositions also offer other distinct advantages over the conventional solvent-type pattern forming coating compositions such as, for example, the higher resistance to oxidation, ultra violet light degradation, and to the action of greases, oils and alkalis obtainable when a polyvinyl acetate latex is utilized.

It is therefore a primary object of this invention to provide novel water based coatings compositions which will yield self-induced hammer effect finishes and methods for preparing said compositions. It is a further object to provide articles of manufacture having hammertone surface coatings derived from the novel coating compositions of this invention. It is another object of this invention to provide methods for applying our novel latex coating compositions to the surface of a base material so as to form a self-induced hammer effect finish on said surface, which finish may then be finally dried.

In general, the hammer effect coating composition of this invention consists essentially of the following ingredients or components in the indicated proportions, each of which will be further defined hereinafter:

|  | Parts by weight | |
|---|---|---|
|  | Typical | Operable Range |
| A. Polyvinyl acetate latex | [1] 100 | [1] 100 |
| B. Pattern forming agent | 80 | 20–100 |
| C. Pattern control agent | 27 | 10–30 |
| D. Preferably: Aqueous dispersion of non-leafing metallic powder [2] | [1] 22 | [1] 15–50 |

[1] Nonvolatile basis.
[2] Hammer effect finishes may be obtained without the use of a metallic pigment. However, the inclusion of metallic powders is preferred because the metallic appearance of the coating is most compatible with the hammered effect.

(A) *Polyvinyl acetate latex.*—We have found that the objects of this invention may be accomplished only by using a polyvinyl acetate latex, which latex must have certain specific properties as indicated hereinafter.

(B) *Pattern forming agent.*—The pattern forming agent is an organic liquid preferably having a relatively fast evaporation rate and preferably strongly hydrophobic in character.

(C) *Pattern control agent.*—This component is an organic liquid which preferably has a substantially lower evaporation rate than the pattern forming agent and which controls the size of the pattern.

(D) *Preferred: An aqueous dispersion of non-leafing metallic powder.*—Dispersions prepared as taught by Knoll, et al., U.S. Patent 2,858,230, and treated with an ammonium phosphate in order to obtain storage stability are preferably used in the practice of this invention. Similar dispersions wherein powdered bronze, brass, copper, etc., are directly substituted for the aluminum may also be used when specific metallic color effects are desired.

Other material well known in the surface coating art may also be added, e.g., fillers, pigments and other colorants, thickening agents, etc. These further additives may not be strongly acidic or strongly basic. The principle and underlying criteria on the use of these further optional additives are that the latex emulsion must not be broken and the aluminum powder must not be attacked nor its protective phosphate coating removed.

The essential characteristics and properties of the ingredients in our new self-texturing latex coating composition are as follows:

(A) *Polyvinyl acetate latex.*—The polyvinyl acetate latex required for the practice of this invention contains a homopolymer prepared by emulsion polymerization, said polymer having a particle size range of 0.75 to 3.0 microns. The emulsifying agents and stabilizers employed for polymerization are chosen with certain limitations in mind. The preferred emulsifier is a non-ionic type while the preferred stabilizer or protective colloid is hydroxyethyl cellulose. The combination of emulsifier and protective colloid is balanced so as to result in a latex of a vinyl acetate polymer having a particle size range of about 0.75 to 3.0 microns; said latex having a nonvolatile content of 45–65 percent (preferably 57–60 percent) by weight, a surface tension of at least 48 dynes/cm. (preferably at least 52 dynes/cm.) and a pH of about 4 to about 8 (preferably 4 to 6). Residual monomer content within the accepted commercial limits, i.e., less than about 1%, is satisfactory. The presence of strongly anionic emulsifiers and protective colloids will tend to prevent pattern formation. When these components are strongly alkaline and a powdered metallic pigment is used, a stable non-gassing system may not be obtainable. The property which appears to be most dominant is the surface tension. Latexes having a surface tension of not less than 48 dynes/cm. and preferably not less than 52 dynes/cm. are essential for the satisfactory practice of this invention. Example 1 (below) clearly illustrates the importance of this factor. The invention may also be practiced using polyvinyl acetate co-polymerized with up to 20% of another vinyl monomer, provided the essential properties noted above are present.

(B) *A pattern forming agent.*—The pattern forming agent of our invention is a liquid organic material which evaporates at a rapid rate and thus produces the driving force or energy for self-induced hammertone formation. The organic liquids used for this purpose are preferably strongly hydrophobic, e.g., practically insoluble in water.

In our copending application S.N. 843,635, filed October 1, 1959, now U.S. 3,047,523, issued July 31, 1962, we have described and claimed certain pattern forming agents for producing self-induced patterns other than hammer effect patterns.

For the purposes of the present invention, i.e., when it is desired to produce a self textured coating which when viewed by the naked eye resembles the appearance of hammered thin sheets, and especially hammered thin metal sheets; certain specific pattern forming agents must be used. Furthermore, a pattern control agent as is further defined hereinafter, is also required for commercial applicability of this invention. The pattern forming agent used in the practice of the instant invention must be a liquid aromatic hydrocarbon or a liquid chlorine substituted aliphatic hydrocarbon, or a mixture of any of these compounds. The boiling point of the selected liquid is preferably between about 70° C. and about 150° C. with a special preference for those liquids or mixtures of liquids which boil between about 80° C. and about 120° C. Examples 6 to 11 of Table II below show a number of pattern forming agents typical of those which have given satisfactory results in producing hammer effects. Toluene is an especially preferred material for this purpose since it offers the best compromise between factors of cost, volatility (i.e., rapidity of evaporation) and toxicity. The method of application determines to some extent the degree of volatility required. Normally when the coating composition is applied by spray methods, a less volatile agent is required than that needed for other methods of application since more agent will usually be lost before the coating reaches the substrate or surface to be coated. As shown by Examples 12 and 13 of Table II, hydrophilic materials are unsatisfactory for use as pattern forming agents. Similarly, Examples 14 to 16 of Table II illustrate the fact that lower boiling hydrocarbons (e.g., hexane, heptane, etc.) are also unsatisfactory.

The amount of pattern forming agent used in the practice of our invention is in the range of from about 20 parts to 100 parts by weight for every 100 parts by weight of polyvinyl acetate solids in the latex base.

(C) *Pattern control agent.*—When self-textured coatings having a hammer effect are to be produced from latex compositions, a pattern control agent is required together with the pattern forming agent, in order to obtain a commercially feasible control of pattern size and appearance. Pattern control agents suitable for the purposes of this invention are liquid, oxygen-containing, aliphatic or cycloaliphatic organic materials having a boiling point of from about 110° C. to about 300° C. We prefer to use materials such as alcohols, glycols, esters, ketones, or ethers, or mixtures of any two or more of these compounds. Members of the terpene family which fall within the above definition are especially useful effective pattern control agents. (See "Terpenes and Related Materials," Hercules Powder Co., copyright, 1947.) Terpene hydrocarbons are not useful as satisfactory pattern control agents as illustrated in Examples 36 to 39 below (Table III).

Unlike the pattern forming agent, the pattern control agent may be water soluble, but this is not a necessary requirement. By properly combining the pattern forming agent and the pattern control agent on the basis of their respective volatilities, the size of the hammer effect pattern may be varied over a wide range. The pattern control agent is preferably less volatile than the pattern forming agent. Suitable combinations of pattern control agent with the pattern forming agent so as to vary the size of the finally obtained self-textured coating will be apparent to those skilled in the art, using the examples hereinafter presented as a guide.

Table IV below gives numerous examples of pattern control agents that have been satisfactorily utilized in practicing the present invention. Within a given chemical class, the pattern size will generally decrease as the evaporation rate of the pattern control agent decreases. Typical preferred pattern control agents are terpinyl methyl ether (Terposol #3) and terpinyl ethylene glycol ether (Terposol #8). Terposol #3 used alone in a concentration of about 45 pounds per 100 gallons of coating composition results in a coarse hammer pattern while the same concentration of Terposol #8 results in a very small pattern. A combination of the two agents in a 1:1 weight ratio so as to give the same total concentration in the coating composition results in a medium size pattern. The uniformity and reproducibility of each pattern size is excellent even after storage of the wet latex coating composition for periods of up to six months or more.

Pattern control agents are used in amounts of from about 10 parts to about 30 parts by weight per 100 parts by weight of polyvinyl acetate solids in the latex in the practice of our invention.

(D) *Preferred: An aqueous dispersion of non-leafing metallic powder.*—As mentioned above, the use of powdered metallic pigments is preferred in the practice of our invention since the metallic appearance of the applied coating is most compatible with the desired hammered effect. A particularly useful metallic pigment is one containing powdered aluminum, and the methods by which a satisfactory aluminum pigment dispersion may be prepared will be described as exemplary.

The aforementioned Knoll et al. patent describes generally the proper use of aluminum pigments in latex coating compositions. However, the teachings of this patent and the modifications suggested therein result only in latex coating compositions which when applied to the surface of a base material or substrata give smooth finishes. Satisfactory self-textured hammer finishes are not obtained when the patentee's suggestions are completely and fully followed.

A non-leafing grade of metallic powder is a necessary ingredient of the dispersion used for this invention. For example an aluminum powder available from Metals Disintegrating Company (assignees of the aforementioned Knoll et al. patent) sold under the designation MD-3100 and having a negligible leafing value is especially adaptable for the purposes of this invention whereas aluminum powders having approximate leafing values of 55 percent and 60 percent (MD-5100 and MD-2100 respectively) and available from the same source of supply have no value in the preparation of self-texturing hammer effect latex coating compositions. Non-leafing metallic powders from other suppliers may also be satisfactorily employed.

Aqueous dispersions of aluminum powder suitable for the practice of this invention may be prepared by methods known to the art. The general formula of a dispersion suitable for this invention is as follows, all parts being parts by weight:

| | Parts |
|---|---|
| Water | 65.0 |
| Diammonium hydrogen phosphate | 1.1 to 1.7 |
| Non-ionic surfactant | 0.45 to 0.90 |
| Aluminum powder | 35.0 |

The procedure as described in the above noted Technical Bulletin No. 108 is basically as follows: Dissolve the diammonium hydrogen phosphate and the surfactant in water making sure that the surfactant is completely dispersed by allowing to stand for approximately 10 minutes, then add the aluminum powder. A normal mixing time required for completely dispersing the aluminum powder within the solution should be approximately another 10 minutes. Be sure that none of the dry pigment remains un-wetted by the phosphate solution. The aluminum paste thus prepared should be permitted to age for 24–48 hours in a loosely covered container before mixing with the water based binder (e.g. polyvinyl acetate latex). This period is necessary to insure sufficient time for the phosphate to react completely with the aluminum to form a barrier coat which renders the aluminum passive.

In practicing this invention, we have found that mono basic and dibasic ammonium phosphates are of equal utility. An ammonium phosphate must be used as the stabilizing agent in our invention. Other phosphates, e.g. tetrasodium pyrophosphate, known to be especially effective as a pigment dispersing agent, do not produce a passive aluminum dispersion, even when used in conjunction with an ammonium phosphate.

Any suitable non-ionic surfactant may be used. For the purposes of this invention the only criterion for determining suitability of the surfactant is that it should not markedly reduce the surface tension of the coating composition and thus tend to prevent pattern formation. Tergitol TMN (trimethyl nonyl ether of polyethylene glycol) has been found quite satisfactory for the purposes of this invention in aiding the wetting out of the aluminum powder without preventing or adversely affecting pattern formation in the applied coating. Other suitable surfactants will be apparent to those skilled in the art, or may be easily determined by routine check tests to determine the effect of said surfactants on the surface tension of the coating composition.

The dispersing technique heretofore described may be varied to some extent without departing from the basic necessity of passivating the aluminum. The ratio of water to aluminum may be varied over a considerable range and the amount of phosphate stabilizing agent may be increased to about twice the amount above specified without any ill effects. The 24–48 hour aging period may be reduced to about 12 hours or less (as little as one hour if found necessary), but aging periods of less than about 10 hours are usually found to result in increased difficulties insofar as stability of the powdered metal dispersion is concerned. Aging periods may also be increased to several weeks without affecting the desired result of self-induced hammer effect patterns in the applied coating. For best overall results, it is preferred to age the metallic pigment dispersion for at least 24 hours before further processing.

Aqueous dispersions of non-leafing grade metallic powders and other than aluminum may also be prepared and used in the practice of this invention. In all cases the metallic powder must be of non-leafing quality and an ammonium phosphate stabilizer must be used. Example 40 below illustrates the use of a non-leafing bronze powder as a direct substitute for aluminum. Other non-leafing powders such as copper, brass, etc. may also be used in similar fashion.

It is again pointed out that although the use of a metallic pigment is preferrd, self-induced hammer effects may also be obtained from latex compositions described above having the metallic pigment dispersion completely omitted. Alternatively, we substitute for the powdered metal other pigments such as flake mica (approximately 160 mesh) or rutile titanium dioxide without materially affecting the ability of the latex composition to produce hammer effect finishes.

(E) *Other additives.*—A plasticizer for the resin may be used to increase the flexibility of the coating where necessary for the use intended. Ordinarily up to 15 percent, based on the weight of the polyvinyl acetate solids of any suitable compound recognized as an effective plasticizing agent for polyvinyl acetate, e.g., dibutyl phthalate, tricresyl phosphate, etc., may be added. The plasticizer may be added by stirring into the latex before compounding the coating composition of this invention but preferably is added by stirring directly into the coating composition after the latex has been added. Pre-emulsification of the plasticizer may be used where necessary to achieve a finely divided dispersion of plasticizer types which resist stir-in addition.

Control of application consistency is achieved by adding a water solution of hydroxyethyl cellulose. Other thickeners suitable for latex systems such as natural gums (e.g. guar gum), modified starches and methyl cellulose may be used. Colloidal clays, bentonite clay and alkaline polyacrylates will tend to give gassing problems and therefore should not be used in our latex coating composition. It is believed that these latter compounds are unsatisfactory because they selectively absorb or otherwise remove and disperse the passivating and stabilizing phosphate layer on the aluminum particles.

(F) *Coloring effects.*—In order to obtain certain decorative effects it may frequently be desirable to incorporate pigments, or other colorants in our latex coating composition. We have, for example, prepared a suitable chromium oxide coloring composition by wetting 65 parts by weight of chromium oxide pigment with a solution of 1.3 parts of a non-ionic surfactant (e.g., alkyl phenyl ether of polyethylene glycol known as Tergitol NPX) in 35 parts of water. When this colorant dispersion is added to our polyvinyl acetate latex coating composition in various amounts ranging generally from about 0.2 to 10% or more by weight of dry color, based on the weight of the total composition, there are produced self-textured hammer finishes having a very attractive green tint, with the color depth corresponding roughly to the quantity of colorant added. Similarly, other commercially produced aqueous pulp and paste colors can be used if routine check tests give assurance that the dispersants used to prepare these color dispersions are not detrimental to the stability of the aqueous dispersion of metallic powder (when used) and are not sufficiently active to effectively reduce the surface tension of the polyvinyl acetate latex and thus prevent the development of the self-induced pattern effects in the final coating, as previously explained. Principal types of color pigments have been found to be satisfactory including oxides, phthalo cyanine blues and greens, carbon black, Hansa yellow and toluidine red. When using a composition containing a metallic pigment the amount of colorant ordinarily used is from about 0.2 to 1.0% (by weight) of the dry color based on the weight of the total composition. In a composition for producing non-metallic fiinishes, up to 10% or more (by weight) of dry color may be used to obtain any certain desired shade of color in the coating as applied.

The preferred method for applying the self-texturing latex coating composition of our invention is by spraying from an ordinary paint spray gun operating in the normal 30 to 60 p.s.i. range. Blade coating methods and dip coating techniques have been used satisfactorily to produce self-induced hammer effects from the latex coating composition of the invention herein described. Interesting textures and patterns can be obtained by using roller coating devices. It is interesting to note however that in this case the roller type paint applier used in ordinary household painting does not create a finish having a self-induced hammer effect while machine roller type coaters are quite satisfactory. This difference in results is most probably explained by the fact that machine rollers have smooth surfaces and are not constructed of the fibrous materials such as lamb's wool, nylon fluff, etc., used in making household-type paint rollers. In normal operation, therefore, machine rollers lay down a smooth film of uniform thickness even when used in applying coatings of poor leveling ability; whereas the manual household-type roller lays down a very rough textured wet film and can only be used with paints having very good leveling qualities.

The following specific examples are given to further illustrate the practice of this invention. It is understood that these examples are merely illustrative of the practice of our invention and are not to be construed as limiting the scope of this invention other than as defined in the appended claims.

EXAMPLE I

In this example a series of coating compositions was prepared to show the effect of surface tension of the polyvinyl acetate latex upon the ability of the latex coating composition to form self-textured coatings. The following standard formula was used:

| Ingredient | Pounds | Gallons | Weight Percent |
|---|---|---|---|
| Non-leafing aluminum powder | 37.41 | 1.80 | 4.32 |
| Polyvinyl acetate latex (58% non-volatile) | 297.72 | 32.01 | 34.36 |
| Water | 318.84 | 38.23 | 36.80 |
| Tricresyl phosphate plasticizer | 8.63 | 0.88 | 1.00 |
| Toluene | 136.65 | 18.87 | 15.77 |
| Terpinyl methyl ether (Terposol #3) | 22.78 | 2.95 | 2.63 |
| Terpinyl ethylene glycol ether (Terposol #8) | 22.78 | 2.78 | 2.63 |
| Hydroxyethyl cellulose (7.5% non-volatile solution) | 19.55 | 2.30 | 2.26 |
| Trimethyl nonyl ether of polyethylene glycol (Tergitol TMN) | 0.91 | 0.11 | 0.10 |
| Monobasic ammonium phosphate | 1.12 | 0.07 | 0.13 |
| Total | 866.39 | 100 | 100 |

In order to prepare the latex coating compositions the manufacturing procedure was as follows:

First.—The aqueous dispersion of non-leafing aluminum powder was prepared by adding the various components to a paint mixer sequentially in the following order: 40% of the water from the above standard formula, ammonium phosphate, non-ionic surfactant (e.g. trimethyl nonyl ether of polyethylene glycol), and the non-leafing aluminum powder. Agitation was continuous during each addition and each component was thoroughly dispersed before the next was added. The aluminum paste was then allowed to age for a period of 24 hours before it was incorporated in the latex coating composition.

Second.—The latex coating composition (i.e., the paint) was prepared by mixing the following ingredients in the order named: aluminum paste (prepared by the above procedure), polyvinyl acetate latex, tricresyl phosphate plasticizer, remainder (i.e., 60%) of the water in the above standard formula, hydroxyethyl cellulose solution, terpinyl methyl ether, terpinyl ethylene glycol ether (these latter two components being the pattern control agents), and finally toluene (pattern forming agent).

A number of commercially available polyvinyl acetate latexes and polyvinyl acetate copolymer latexes were incorporated in the above noted standard formula, following the procedure as set forth immediately above in each instance. Results were as follows:

*Table I*

EFFECTS OF SURFACE TENSION UPON THE ABILITY OF RESIN LATEXES TO FORM SELF-TEXTURED COATING FINISHES

| Polymer | Surface tension (dynes/cm.) | Pattern |
| --- | --- | --- |
| I. Homopolymers: | | |
| Commercial resin A | 35.9–38.5 | No hammer. |
| Commercial resin B | 52 | Good hammer. |
| Commercial resin C | 39.5 | No hammer. |
| II. Copolymers: | | |
| Commercial copolymer D | 37.8 | Do. |
| Commercial copolymer E | 42.6 | Do. |
| Commercial acrylic copolymer | 44.6 | Do. |

The data of Table I is self-explanatory, clearly illustrating the extreme importance of using a polyvinyl acetate latex having a surface tension of at least about 48 dynes/cm. and preferably at least 52 dynes/cm.

EXAMPLE 2

The properties of the latex coating composition containing commercial resin B as the polyvinyl acetate latex in the standard formula of Example 1 were further studied. The following results were obtained:

Viscosity _____ 110 cps. (Brookfield, #4 spindle, 60 r.p.m.).
Non-volatile content _____ 25.7% by weight.
Volume ratio of aluminum pigment _____ 8.82%.
Weight per gallon _____ 8.66 pounds.

This self-texturing polyvinyl acetate latex coating composition was sprayed on card stock using an ordinary paint spray gun operating at 30–60 p.s.i. The coating was then dried for two minutes in a 250° F. oven. An attractive hammertone finish was produced.

EXAMPLES 3 AND 4

In this example the formulation of the polyvinyl acetate latex coating composition was slightly modified, as shown below. In addition the less volatile pattern control agent, i.e., terpinyl ethylene glycol ether was eliminated.

| Ingredient | Pounds | Gallons | Weight percent |
| --- | --- | --- | --- |
| Non-leafing aluminum powder | 39.70 | 1.91 | 4.56 |
| Polyvinyl acetate latex (commercial resin B of Examples 1 and 2 having 58% non-volatiles) | 315.95 | 34.34 | 36.27 |
| Water | 338.39 | 40.57 | 38.84 |
| Tricresyl phosphate | 9.16 | 0.93 | 1.05 |
| Toluene | 96.68 | 13.35 | 11.10 |
| Terpinyl methyl ether | 48.34 | 6.27 | 5.55 |
| Hydroxyethyl cellulose solution (7.5% non-volatile) | 20.75 | 2.44 | 2.38 |
| Trimethyl nonyl ether of polyethylene glycol | 0.97 | 0.11 | 0.11 |
| Monobasic ammonium phosphate | 1.19 | 0.08 | 0.14 |
| Total | 871.13 | 100 | 100 |

The manufacturing procedure described in Example 1 was again followed. The properties of this self-texturing latex coating composition were as follows:

Viscosity _____ 120 cps. (Brookfield, #4 spindle, 60 r.p.m.).
Non-volatile content _____ 27.07%.
Volume ratio of aluminum pigment _____ 8.82%.
Weight per gallon _____ 8.71 pounds.

When this composition was sprayed on card stock and dried in the same manner as the composition of Example 2, a hammer effect was produced having a larger pattern size than the hammer effect obtained in Example 2.

When terpinyl ethylene glycol ether is used to replace all of the terpinyl methyl ether in the modified formulation of Example 3 immediately above, and the latex coating composition is applied to card stock using the spraying and drying procedure of Example 2, the coating produced has a hammer effect pattern smaller in size and more finely textured than the hammer effects obtained in either one of the preceding Examples 2 and 3. Examples 2, 3 and 4 taken together therefore illustrate the possible variations that may be achieved in pattern size and appearance by varying the relative volatilities of the pattern forming agent and the pattern control agent(s).

EXAMPLE 5

This example is the same as Example 2 with the exception that 5% by weight (based on the total latex coating composition) of a 25% water dispersion of copper phthalocyanine green was added. An attractive and very decorative green textured hammer effect of medium pattern size was produced.

EXAMPLES 6–16

In the following examples the manufacturing procedures and the standard formulation of Example 2 were used to prepare a number of self-texturing polyvinyl acetate latex coating compositions containing various types of pattern forming agents in lieu of the toluene shown in Example 2. Results are shown in Table II:

*Table II*

PATTERN FORMING AGENTS FOR HAMMER EFFECTS

| Ex. | Agent | Parts per 100 parts of polymer solids in latex | Amount added, parts per 100 parts of total base composition | Pattern | Boiling pt. of agent in °C. |
| --- | --- | --- | --- | --- | --- |
| 6 | Benzene | 100 | 20 | Med. hammer | 80 |
| 7 | Toluene [1] | 85.5 | 17 | Fine hammer | 110.6 |
| 8 | do.[1] | 126 | 25 | do | 110.6 |
| 9 | do | 100 | 20 | Good hammer | 110.6 |
| 10 | Carbon tetrachloride | 100 | 20 | Medium hammer | 76.8 |
| 11 | Perchloroethylene | 100 | 20 | Coarse hammer | 121 |
| 12 | Ethyl acetate | 100 | 20 | No regular pattern | 77.2 |
| 13 | Isopropyl alcohol | 100 | 20 | do | 82.4 |
| 14 | Hexane | 100 | 20 | do | 68.7 |
| 15 | Heptane | 100 | 20 | do | 92 |
| 16 | Iso octane | 100 | 20 | do | 99.2 |

[1] In Examples 7 and 8 cyclohexanone was substituted as pattern control agent for the mixture of terpinyl methyl ether and terpinyl ethylene glycol ether of Example 2.

EXAMPLES 17–39

In the following examples the manufacturing procedures and the standard formulation of Example 2 were used to prepare a series of self-texturing polyvinyl acetate latex coating compositions containing various pattern control agents as substitutes for the 5.26 percent of the terpinyl methyl ether and terpinyl ethylene glycol ether mixture used in Example 2. Results are shown in Table III.

Table III
PATTERN CONTROL AGENTS FOR HAMMER EFFECTS

| Ex. | Agent | Weight percent of total composition | Pattern | Boiling pt. of agent in in ° C. |
|---|---|---|---|---|
| 17 | Methyl isobutyl ketone | 5.4 | Fair hammer | 114–117 |
| 18 | Cyclohexanone | 5.4 | Med. hammer | 130–173 |
| 19 | Diacetone alcohol | 5.4 | do | 140–175 |
| 20 | 2-amino, 2-methyl, 1-propanol | 5.4 | Large hammer | 151 |
| 21 | Methyl butynol | 5.4 | Med. hammer | 104–105 |
| 22 | Methyl pentynol | 5.4 | do | 121–122 |
| 23 | Ethoxy triglycol | 5.4 | Faint hammer | 255.8 |
| 24 | Polypropylene glycol | 5.4 | Sharp deep hammer | (¹) |
| 25 | Hexylene glycol | 5.4 | Med. hammer | 206–207 |
| 26 | Diethylene glycol diethyl ether | 5.4 | Open hammer | 180–190 |
| 27 | Dimethyl benzyl alcohol | 5.4 | Fine hammer | 167–169 |
| 28 | Ethyl amino ethanol | 5.4 | Lg. pattern | 167–169 |
| 29 | Cyclohexanol | 5.4 | Very fine hammer | 158–162 |
| 30 | Glycol diacetate | 5.4 | Fair med. hammer | 183–195 |
| 31 | Terpinyl methyl ether | 5.4 | Lg. hammer | 210–220 |
| 32 | Terpinyl ethylene glycol ether | 5.4 | Sm. hammer | 252–287 |
| 33 | Alpha terpineol | 5.4 | Fair hammer | 219–222 |
| 34 | Terpineol 318 ² | 5.4 | Swirl hammer | 217–219 |
| 35 | Pine oil | 5.4 | Fair hammer | 213–220 |
| | Terpene hydrocarbons: | | | |
| 36 | Alpha Pinene | 5.4 | No hammer | 156–158 |
| 37 | Turpentine | 5.4 | do | 157–165 |
| 38 | Dipentene | 5.4 | do | 175–181 |
| 39 | Solvenol #1 ³ | 5.4 | do | 175–187 |

¹ Does not boil.
² A mixture of: Alpha terpineol 55, 60%; beta terpineol 17, 22%; other tert.=alcohols, 20%; terpene hydrocarbons, 3%.
³ Typical composition of Solvenol #1: Pinene and other bicyclic terpenes, 5–10%; Dipentene, 30–40%; Para-cymene, 10–15%; Para-menthane and para-menthenes, 20–25%; Terpinolene and other monocyclic terpenes, 10–20%; Low boiling terpene alcohols and ketones, 5–10%.

EXAMPLE 40

In this example the manufacturing procedures and standard formulation of Example 2 were used, with the single exception of directly substituting for the 4.32% by weight of non-leafing aluminum powder the same amount by weight of a non-leafing bronze powder. When the coating composition so obtained was sprayed on card stock by procedures described in Example 2, a beautiful gold colored hammertone finish was produced.

Hammer effect coating compositions of this invention are useful in decorating all types of surfaces made from a wide variety of materials including metal, wood, paper, fiber stocks, cloth and plaster. Coated materials produced according to the teachings of this invention are useful for numerous manufactured articles such as, for example, cabinets, office furniture, manufacturing equipment and housings therefor, wrapping papers, wallpaper, ceiling tile, wall boards and other wall covering material.

Polyvinyl acetate latex coating compositions which produce self-textured hammer effect coatings according to the teachings of this invention are believed to represent a very desirable advance in the art of hammer finish formulation in that water is the primary vehicle for the coating materials. Excellent control and reproducibility of the hammertone pattern type and size has been achieved. Storage of exemplary formulations for periods of six months or more has resulted in no significant change in the ability of these compositions to develop the same self-induced hammer effect patterns observed when the compositions were used immediately after original preparation. The addition of aqueous dispersions of pigments and other colorants may be achieved by simple stir-in mixing techniques and permits the production of self-textured coatings having a wide range of colors and tints without the necessity of resorting to milling or grinding operations.

In addition to these advantages and other advantages noted previously, the polyvinyl acetate latex based hammer finishes exhibit equal or better ability to mask surface defects as compared to the conventional resin solution types of hammer effect coating compositions while at the same time retaining or improving upon the attractive decorative appearance which characterized such finishes.

Having fully described our invention and the methods of practicing the same, we claim:

1. A polyvinyl acetate latex composition for producing self-induced hammer effect coatings which consists essentially of:
   (a) A polyvinyl acetate latex having a non-volatile content of from 45 to 65 percent, a surface tension of at least about 48 dynes/cm. and a pH within the range of from about 4 to about 8, and wherein the said polyvinyl acetate has a particle size of from about 0.75 to about 3.0 microns;
   (b) For every 100 parts of polyvinyl acetate solids in said latex between about 20–100 parts of a liquid pattern forming agent having a boiling point in the range of from about 70° C. to about 150° C. and selected from at least one of the members of the group consisting of aromatic hydrocarbons, and chlorine substituted aliphatic hydrocarbons, and
   (c) For every 100 parts by weight of polyvinyl acetate solids in said latex, between about 10 to 30 parts by weight of a liquid, organic pattern control agent having a boiling point within the range of from about 100° C. to about 300° C. and selected from at least one of the members of the group consisting of alcohols, esters, ketones, and ethers.

2. A composition as defined in claim 1 wherein the said latex has a non-volatile content of about 57–60 percent and a surface tension of not less than 52 dynes/cm.

3. An article of manufacture which comprises a base material having a hammer effect surface coating thereon, said surface coating consisting essentially of the dried product of the composition defined in claim 1.

4. A polyvinyl acetate latex composition for producing self-induced hammer effect coatings which consists essentially of:
   (a) A polyvinyl acetate latex having a non-volatile content of from 45 to 65 percent, a surface tension of at least about 48 dynes/cm. and a pH within the range of from about 4 to about 8, and wherein the said polyvinyl acetate has a particle size of from about 0.75 to about 3.0 microns;
   (b) For every 100 parts of polyvinyl acetate solids in said latex between about 20–100 parts of a liquid pattern forming agent having a boiling point in the range of from about 70° C. to about 150° C. and selected from at least one of the members of the group consisting of aromatic hydrocarbons, and chlorine substituted aliphatic hydrocarbons;
   (c) For every 100 parts of polyvinyl acetate solids in said latex, between about 10–30 parts of a liquid, organic pattern control agent having a boiling point within the range of from about 100° C. to about 300° C. and selected from at least one of the members of the group consisting of alcohols, esters, ketones, and ethers; and
   (d) For every 100 parts of polymer solids in said latex, about 15–50 parts, based on the solids content thereof, of a stable aqueous dispersion of a non-leafing metallic powder; said dispersion containing an ammonium phosphate as the sole stabilizing agent.

5. A polyvinyl acetate latex composition as defined in claim 4 wherein the said liquid pattern forming agent is benzene.

6. A polyvinyl acetate latex composition as defined in claim 4 wherein the said liquid pattern forming agent is carbon tetrachloride.

7. A polyvinyl acetate latex composition as defined in claim 4 wherein the said liquid pattern forming agent is tetrachloroethylene.

8. A polyvinyl acetate latex composition as defined in claim 4 wherein the liquid pattern control agent is terpinyl methyl ether.

9. A polyvinyl acetate latex composition as defined in claim 4 wherein the liquid pattern control agent is terpinyl ethylene glycol ether.

10. A polyvinyl acetate latex composition as defined in claim 4 wherein the liquid pattern control agent is cyclohexanone.

11. A polyvinyl acetate latex composition as defined in claim 4 wherein the liquid pattern control agent is cyclohexanol.

12. A polyvinyl acetate latex composition as defined in claim 4 wherein the liquid pattern control agent is methyl isobutyl ketone.

13. A composition as defined in claim 4 wherein the said latex has a non-volatile content of about 57–60 percent and a surface tension of not less than 52 dynes/cm.

14. An article of manufacture which comprises a base material having on the surface thereof a self-induced hammer effect coating, said coating consisting essentially of the dried product of the composition defined in claim 4.

15. A polyvinyl acetate latex composition for producing self-induced hammer effect coatings which consists essentially of:
(a) A polyvinyl acetate latex having a non-volatile content of from 45 to 65 percent, a surface tension of at least about 48 dynes per centimeter and a pH within the range of from about 4 to about 8 and wherein the said polyvinyl acetate has a particle size of from about 0.75 to about 3.0 microns;
(b) For every 100 parts of polyvinyl acetate solids in said latex, between about 20 and about 100 parts of toluene; and
(c) For every 100 parts of polyvinyl acetate solids in said latex, between about 10 and about 30 parts of terpinyl ethylene glycol ether; and
(d) For every 100 parts of polyvinyl acetate solids in said latex, about 15 to 50 parts, based on the solids content thereof, of a stable aqueous dispersion of a non-leafing aluminum powder; said dispersion containing an ammonium phosphate as the sole stabilizing agent.

16. An article of manufacture which comprises a base material having on the surface thereof a self-induced hammer effect coating, said coating consisting essentially of the dried product of the composition defined in claim 15.

17. A polyvinyl acetate latex composition for producing self-induced hammer effect coatings which consists essentially of:
(a) A polyvinyl acetate latex having a non-volatile content of from 45 to 65 percent, a surface tension of at least about 48 dynes per centimeter and a pH within the range of from about 4 to about 8, and wherein the said polyvinyl acetate has a particle size of from about 0.75 to about 3.0 microns;
(b) For every 100 parts of polyvinyl acetate solids in said latex, between about 20 and about 100 parts of toluene; and
(c) For every 100 parts of polyvinyl acetate solids in said latex between about 10 and about 30 parts of a mixture of terpinyl methyl ether and terpinyl ethylene glycol ether; and
(d) For every 100 parts of polyvinyl acetate solids in said latex, about 15 to 50 parts, based on the solids content thereof, of a stable aqueous dispersion of a non-leafing aluminum powder; said dispersion containing an ammonium phosphate as the sole stabilizing agent.

18. An article of manufacture which comprises a base material having on the surface thereof a self-induced hammer effect coating, said coating consisting essentially of the dried product of the composition defined in claim 17.

19. A polyvinyl acetate latex composition for producing self-induced hammer effect coatings which consists essentially of:
(a) A polyvinyl acetate latex having a non-volatile content of from 45 to 65 percent, a surface tension of at least about 48 dynes per centimeter and a pH within the range of from about 4 to about 8, and wherein the said polyvinyl acetate has a particle size of from about 0.75 to about 3.0 microns;
(b) For every 100 parts of polyvinyl acetate solids in said latex, between about 20 and about 100 parts of toluene; and
(c) For every 100 parts of polyvinyl acetate solids in said latex, between about 10 and about 30 parts of terpinyl ethylene glycol ether; and
(d) For every 100 parts of polyvinyl acetate solids in said latex, about 15 to 50 parts, based on the solids content thereof, of a stable aqueous dispersion of a non-leafing bronze powder; and dispersion containing an ammonium phosphate as the sole stabilizing agent.

20. A polyvinyl acetate latex composition for producing self-induced hammer effect coatings which consists essentially of:
(a) A polyvinyl acetate latex having a non-volatile content of from 45 to 65 percent, a surface tension of at least about 48 dynes per centimeter and a pH within the range of from about 4 to about 8, and wherein the said polyvinyl acetate has a particle size of from about 0.75 to about 3.0 microns; and
(b) For every 100 parts of polyvinyl acetate solids in said latex, between about 20 and about 100 parts of toluene; and
(c) For every 100 parts of polyvinyl acetate solids in said latex, between about 10 and about 30 parts of a mixture of terpinyl methyl ether and terpinyl ethylene glycol ether; and
(d) For every 100 parts of polyvinyl acetate solids in said latex, about 15 to 50 parts, based on the solids content thereof, of a stable aqueous dispersion of a non-leafing bronze powder; and dispersion containing an ammonium phosphate as the sole stabilizing agent.

21. A polyvinyl acetate latex composition for producing self-induced hammer effect coatings which consists essentially of:
(a) A polyvinyl acetate latex having a non-volatile content of from 45 to 65 percent, a surface tension of at least about 48 dynes/cm. and a pH within the range of from about 4 to about 8, and wherein the said polyvinyl acetate has a particle size of from about 0.75 to about 3.0 microns;
(b) For every 100 parts of polyvinyl acetate solids in said latex, between about 20 and 100 parts of toluene;
(c) For every 100 parts of polyvinyl acetate solids in said latex, between about 10 and 30 parts of terpinyl methyl ether; and
(d) For every 100 parts of polyvinyl acetate solids in said latex, about 15–50 parts, based on the solids content thereof, of a stable aqueous dispersion of a non-leafing aluminum powder; said dispersion containing an ammonium phosphate as the sole stabilizing agent.

22. An article of manufacture which comprises a base material having on the surface thereof a self-induced hammer effect coating, said coating consisting essentially of the dried product of the composition defined in claim 21.

23. A polyvinyl acetate latex composition for producing self-induced hammer effect coatings which consists essentially of:
(a) A polyvinyl acetate latex having a non-volatile content of from 45 to 65 percent, a surface tension of at least about 48 dynes/cm. and a pH within the range of from about 4 to about 8, and wherein the said polyvinyl acetate has a particle size of from about 0.75 to about 3.0 microns;
(b) For every 100 parts of polyvinyl acetate solids in said latex, between about 20 and 100 parts of toluene;
(c) For every 100 parts of polyvinyl acetate solids in said latex, between about 10 and 30 parts of cyclohexanone; and
(d) For every 100 parts of polyvinyl acetate solids in said latex, about 15–50 parts, based on the solids content thereof, of a stable aqueous dispersion of a non-leafing aluminum powder; said dispersion containing an ammonium phosphate as the sole stabilizing agent.

24. An article of manufacture which comprises a base material having on the surface thereof a self-induced hammer effect coating, said coating consisting essentially of the dried product of the composition defined in claim 23.

25. A polyvinyl acetate latex composition for producing self-induced hammer effect coatings which consists essentially of:
(a) A polyvinyl acetate latex having a non-volatile content of from 45 to 65 percent, a surface tension of at least about 48 dynes/cm. and a pH within the range of from about 4 to about 8, and wherein the said polyvinyl acetate has a particle size of from about 0.75 to about 3.0 microns;
(b) For every 100 parts of polyvinyl acetate solids in said latex, between about 20 and 100 parts of toluene;
(c) For every 100 parts of polyvinyl acetate solids in said latex, between about 10 and 30 parts of terpinyl methyl ether; and
(d) For every 100 parts of polyvinyl acetate solids in said latex, about 15–50 parts, based on the solids content thereof, of a stable aqueous dispersion of a non-leafing bronze powder; said dispersion containing an ammonium phosphate as the sole stabilizing agent.

26. An article of manufacture which comprises a base material having on the surface thereof a self-induced hammer effect coating, said coating consisting essentially of the dried product of the composition defined in claim 25.

References Cited in the file of this patent

UNITED STATES PATENTS

| | | |
|---|---|---|
| 1,896,594 | Root | Feb. 7, 1933 |
| 2,508,092 | Beynon | May 16, 1950 |
| 2,643,982 | Riley | June 30, 1953 |
| 2,682,517 | Asaff | June 29, 1954 |
| 2,858,230 | Knoll et al. | Oct. 28, 1958 |

OTHER REFERENCES

Singer: "Fundamentals of Paint, Varnish, and Lacquer Technology," American Paint Journal Co., St. Louis, Mo. (1957), pages 292–293.

"Terpenes and Related Materials," Hercules Powder Company, copyright 1947.